United States Patent
Imanishi

(10) Patent No.: US 8,694,641 B2
(45) Date of Patent: Apr. 8, 2014

(54) IMAGE DELIVERY MANAGEMENT SERVER AND IMAGE DELIVERY MANAGEMENT SYSTEM

(75) Inventor: Masayuki Imanishi, Kanagawa (JP)

(73) Assignee: Sony Corporation (JP)

( * ) Notice: Subject to any disclaimer, the term of this patent is extended or adjusted under 35 U.S.C. 154(b) by 358 days.

(21) Appl. No.: 13/065,459

(22) Filed: Mar. 22, 2011

(65) Prior Publication Data

US 2011/0246604 A1   Oct. 6, 2011

(30) Foreign Application Priority Data

Mar. 31, 2010 (JP) ................................ P2010-082338

(51) Int. Cl.
   *G06F 15/173* (2006.01)
(52) U.S. Cl.
   USPC ........... 709/226; 709/217; 709/219; 709/224; 709/225; 709/229
(58) Field of Classification Search
   USPC ......... 709/238, 239, 226, 217, 219, 224, 225, 709/229; 715/747; 725/96, 78, 42, 33, 91; 713/168; 705/14.5, 50; 707/748; 370/386; 455/74
   See application file for complete search history.

(56) References Cited

U.S. PATENT DOCUMENTS

| | | | |
|---|---|---|---|
| 7,580,348 B2 | 8/2009 | Maruyama et al. | |
| 2007/0038567 A1* | 2/2007 | Allaire et al. | 705/50 |
| 2007/0127519 A1* | 6/2007 | Hasek et al. | 370/466 |
| 2008/0207137 A1* | 8/2008 | Maharajh et al. | 455/74 |
| 2008/0310408 A1* | 12/2008 | Thompson et al. | 370/386 |
| 2009/0007198 A1* | 1/2009 | Lavender et al. | 725/91 |
| 2010/0031162 A1* | 2/2010 | Wiser et al. | 715/747 |
| 2010/0088718 A1* | 4/2010 | Hasek et al. | 725/33 |
| 2010/0094878 A1* | 4/2010 | Soroca et al. | 707/748 |
| 2010/0138863 A1* | 6/2010 | Diaz Perez | 725/42 |
| 2010/0205049 A1* | 8/2010 | Long et al. | 705/14.5 |
| 2011/0197237 A1* | 8/2011 | Turner | 725/78 |
| 2011/0219229 A1* | 9/2011 | Cholas et al. | 713/168 |
| 2012/0317604 A1* | 12/2012 | Stallard | 725/96 |

FOREIGN PATENT DOCUMENTS

JP   4083169 B2   4/2008
JP   2009-118319 A   5/2009

* cited by examiner

*Primary Examiner* — Le H Luu
(74) *Attorney, Agent, or Firm* — Lerner, David, Littenberg, Krumholz & Mentlik, LLP

(57) ABSTRACT

An image delivery management server of present invention includes a delivery load amount acquiring portion that acquires a delivery load amount of an image that is delivered to a viewer's terminal connected via a network, and a delivery device determining portion that determines, based on the delivery load amount, a type or a quantity of a delivery device that performs image delivery to the viewer's terminal.

5 Claims, 16 Drawing Sheets

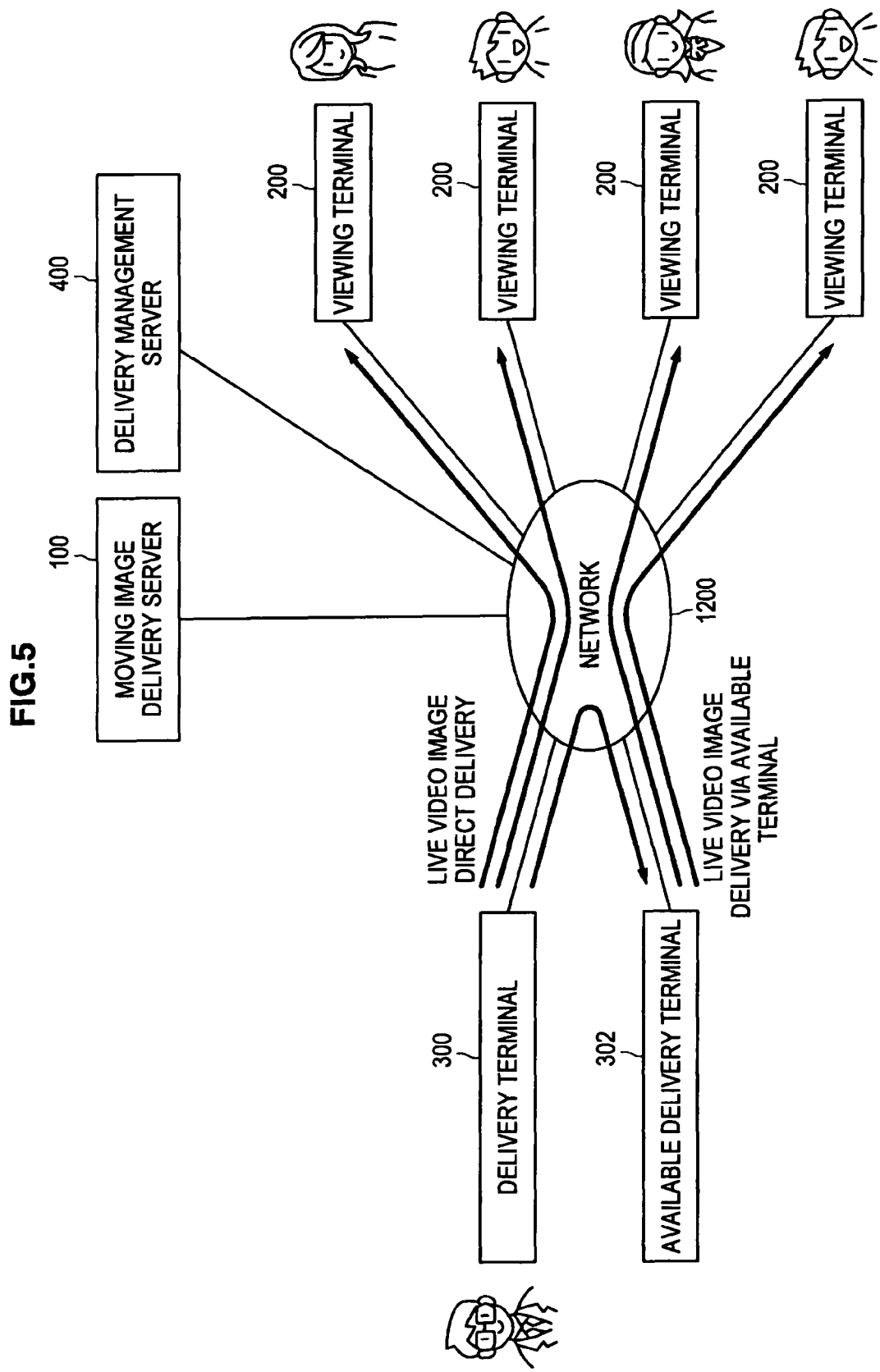

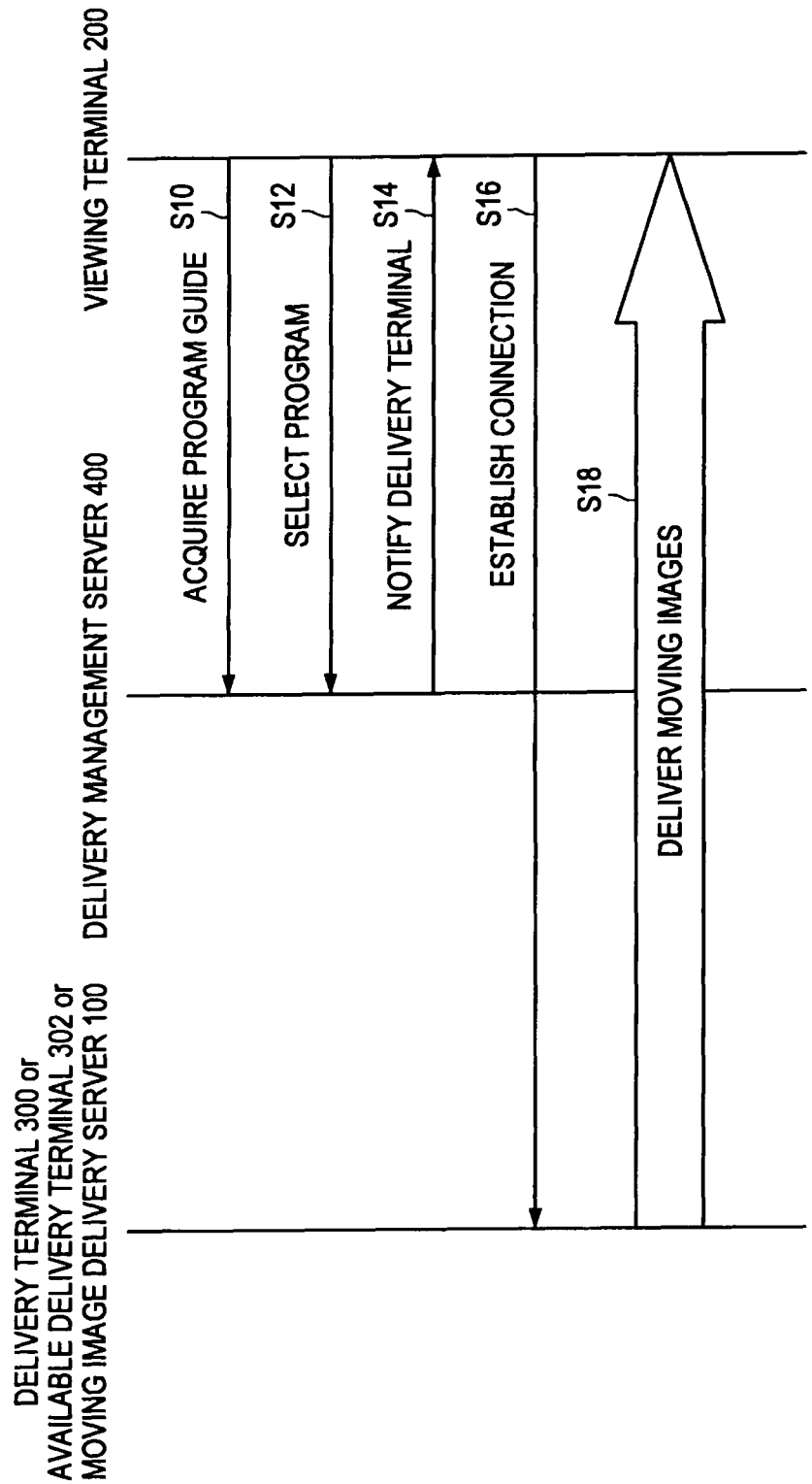

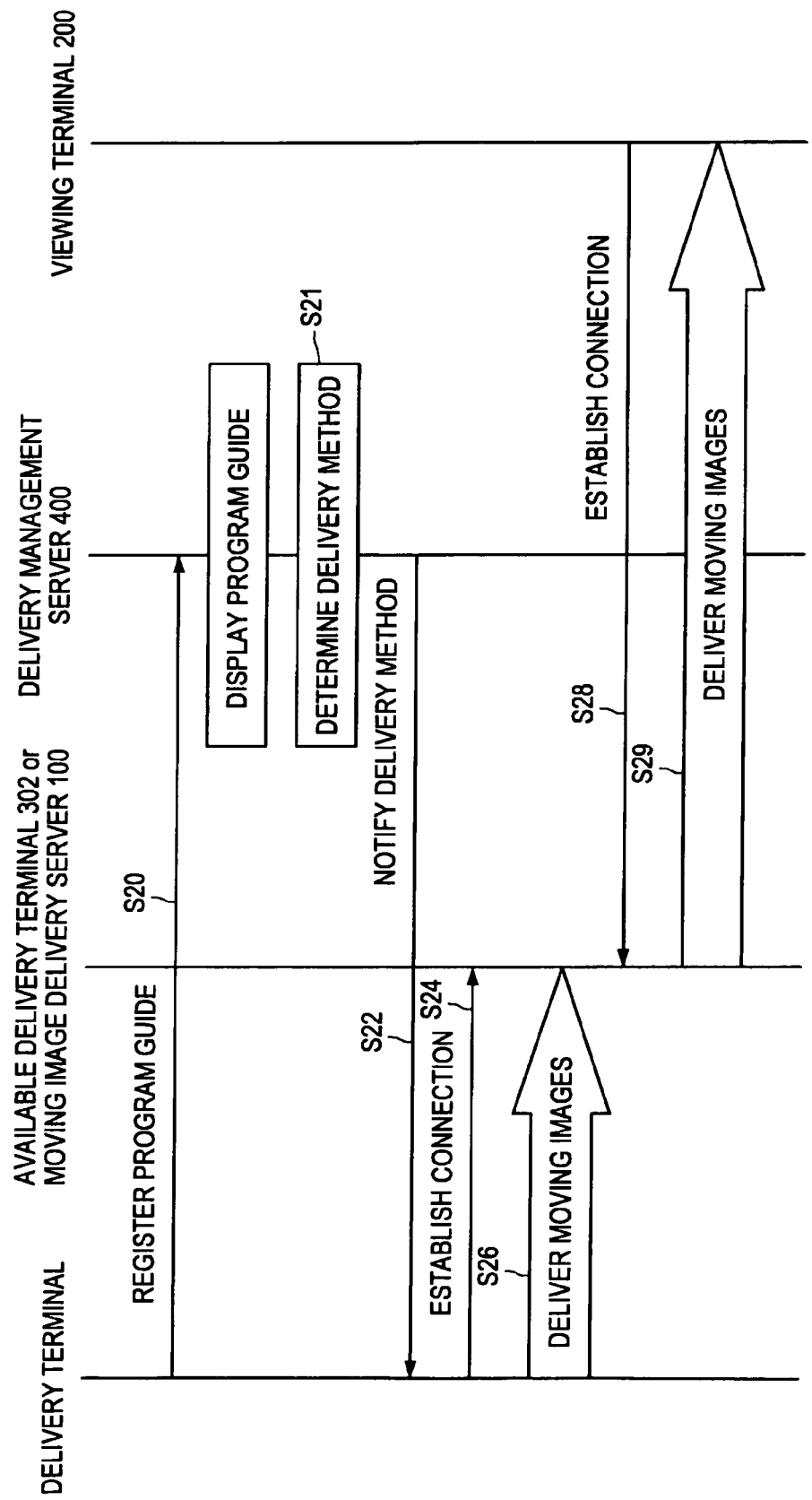

FIG.8

PROGRAM GUIDE DATABASE

| PROGRAM NAME | DELIVERY PROVIDER | DELIVERY TIME | NUMBER OF VIEWER RESERVATIONS | NUMBER OF VIEWERS |
|---|---|---|---|---|
| PROGRAM 1 | A | 18:00-19:00 | 5682 | 8321 |
| PROGRAM 2 | B | 18:00-19:30 | 13 | 19 |
| PROGRAM 3 | C | 19:00-20:00 | 7 | 0 |

DELIVERY TERMINAL MANAGEMENT DETABASE

| DELIVERY TERMINAL NAME | IP ADDRESS | MAXIMUM POTENTIAL NUMBER OF DELIVERIES | DELIVERY STATUS | CURRENT NUMBER OF DELIVERIES |
|---|---|---|---|---|
| DELIVERY TERMINAL 1 | 1.1.1.1 | 50 | DELIVERING | 45 |
| DELIVERY TERMINAL 2 | 2.2.2.2 | 70 | DELIVERING | 3 |
| DELIVERY TERMINAL 3 | 3.3.3.3 | 60 | AVAILABLE | 0 |

IMAGE DELIVERY MANAGEMENT SERVER AND IMAGE DELIVERY MANAGEMENT SYSTEM

CROSS-REFERENCE TO RELATED APPLICATION

The present application claims priority from Japanese Patent Application No. JP 2010-082338 filed in the Japanese Patent Office on Mar. 31, 2010, the entire content of which is incorporated herein by reference.

BACKGROUND OF THE INVENTION

1. Field of the Invention

The present invention relates to an image delivery management server and an image delivery management system.

2. Description of the Related Art

In known art, for example, Japanese Patent Application Publication No. JP-A-2009-118319 describes a method to determine whether content should be delivered or not based on information relating to a network surplus value and network utilization bandwidth. Further, Japanese Patent Publication No. 4083169 describes a method to determine whether content should be delivered or not using a load factor table, hourly historical data etc. when lines are switched between a spare line and an operation line depending on a load factor.

SUMMARY OF THE INVENTION

However, with the technology described in Japanese Patent Application Publication No. JP-A-2009-118319, since the technology only performs delivery from a delivery server, it is assumed that it becomes difficult to perform the delivery when a load on the delivery server becomes high. Further, with the technology described in Japanese Patent Publication No. 4083169, since a number of server lines is increased in accordance with an increase of a delivery load, problems arise in which a structure that includes the server becomes complex and a cost increase is incurred.

Therefore, in light of the foregoing, the present invention provides a novel and improved image delivery management server and image delivery management system that are capable, with a simple structure, of determining a delivery device in accordance with an image delivery load.

According to an embodiment of the present invention, there is provided an image delivery management server includes a delivery load amount acquiring portion that acquires a delivery load amount of an image that is delivered to a viewer's terminal connected via a network, and a delivery device determining portion that determines, based on the delivery load amount, a type or a quantity of a delivery device that performs image delivery to the viewer's terminal.

In this configuration, the delivery load amount acquiring portion includes a viewer's terminal information acquiring portion that acquires information relating to the viewer's terminal to which the image is delivered, and the delivery device determining portion determines the type or the quantity of the delivery device in accordance with the information relating to the viewer's terminal.

In this configuration, the information relating to the viewer's terminal includes at least a current or past number of viewers to which the image is delivered or a number of viewers who have reserved the image that is to be delivered.

In this configuration, the delivery load amount acquiring portion further includes a utilization bandwidth acquiring portion that acquires a utilization bandwidth of the network that is used by the image delivery, and the delivery device determining portion determines the type or the quantity of the delivery device based on a number of viewers and the utilization bandwidth.

In this configuration, the delivery device includes at least one of at least one delivery terminal that directly delivers the image to the viewer's terminal and a delivery server that delivers an image uploaded from the delivery terminal to the viewer's terminal.

In this configuration, the delivery device determining portion determines the quantity of the delivery terminal that delivers the image to the viewer's terminal based on a predetermined threshold value relating to one of the number of viewers and the utilization bandwidth, and also determines whether only the delivery server delivers the image to the viewer's terminal.

In this configuration, the delivery device determining portion increases the quantity of the delivery terminal that delivers the image in accordance with an increase of one of the number of viewers and the utilization bandwidth, and determines that only the delivery server delivers the image to the viewer's terminal, when one of the number of viewers and the utilization bandwidth exceeds the predetermined threshold value.

In this configuration, the delivery device determining portion makes a switch from delivery using only the delivery server to delivery using a plurality of the delivery terminals, when one of the number of viewers and the utilization bandwidth becomes less than or equal to the predetermined threshold value, and also decreases the quantity of the delivery terminals by which the image is delivered in accordance with a further decrease of one of the number of viewers and the utilization bandwidth.

In this configuration, the delivery device determining portion causes both a device that is made to stop delivering and a device that is made to continue delivering to temporarily deliver an image stream, when the delivery using only the delivery server is switched to the delivery using the plurality of the delivery terminals or when the quantity of the delivery terminals is decreased.

In this configuration, the delivery device determining portion causes both the device that is made to stop delivering and the device that is made to continue delivering to temporarily deliver the image stream and also makes the bandwidth of each of the image stream narrower than usual, when the delivery using only the delivery server is switched to the delivery using the plurality of the delivery terminals or when the quantity of the delivery terminals is decreased.

According to another embodiment of the present invention, there is provided an image delivery system includes an image delivery management server, a delivery device and a viewer's terminal. The image delivery management server includes a delivery load amount acquiring portion that acquires a delivery load amount of an image that is delivered to a viewer's terminal connected via a network, and a delivery device determining portion that determines, based on the delivery load amount, a type or a quantity of a delivery device that performs an image delivery to the viewer's terminal. The delivery device is connected to the image delivery management server and the viewer's terminal via the network. The viewer's terminal is connected to the image delivery management server and the delivery device via the network.

According to the present invention, it is possible to provide a novel and improved image delivery management server and image delivery management system that are capable, with a simple structure, of determining a delivery device in accordance with an image delivery load.

BRIEF DESCRIPTION OF THE DRAWINGS

FIG. 5 is a schematic diagram showing a network structure of live delivery using an available delivery terminal;

FIG. 6 is a schematic diagram showing a viewing start sequence of a viewing user;

FIG. 7 is a sequence diagram showing delivery start processing by a delivery provider of the live video images;

FIG. 8 is a schematic diagram showing information that is managed on a database within a delivery management server;

DETAILED DESCRIPTION OF THE EMBODIMENT(S)

Figure 1B:
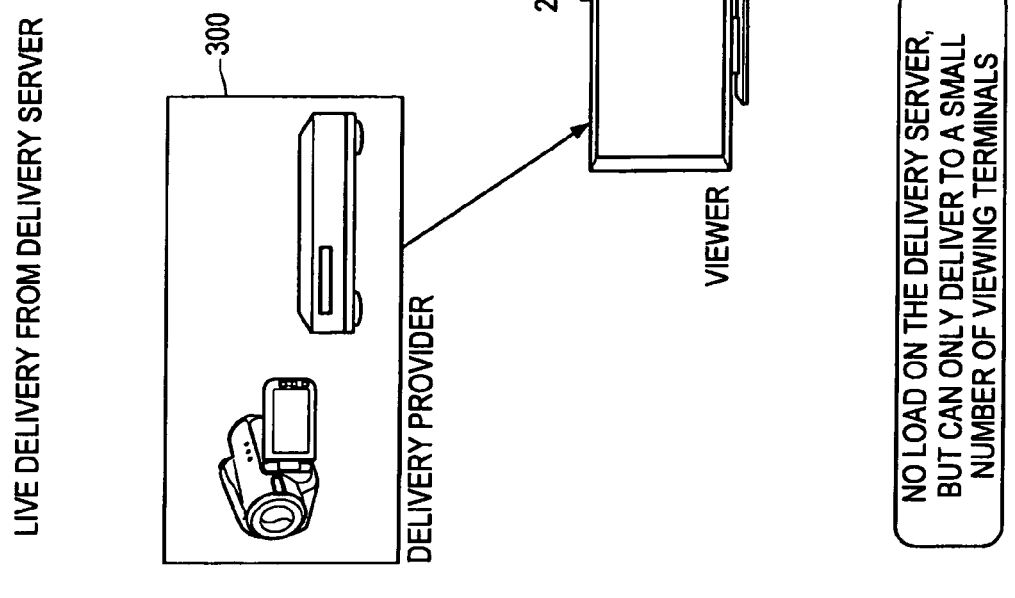
FIG. 1A and FIG. 1B are schematic diagrams respectively showing an overview of a method to deliver live video images.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Note that an explanation will be given below in the following order.

Figure 1A:
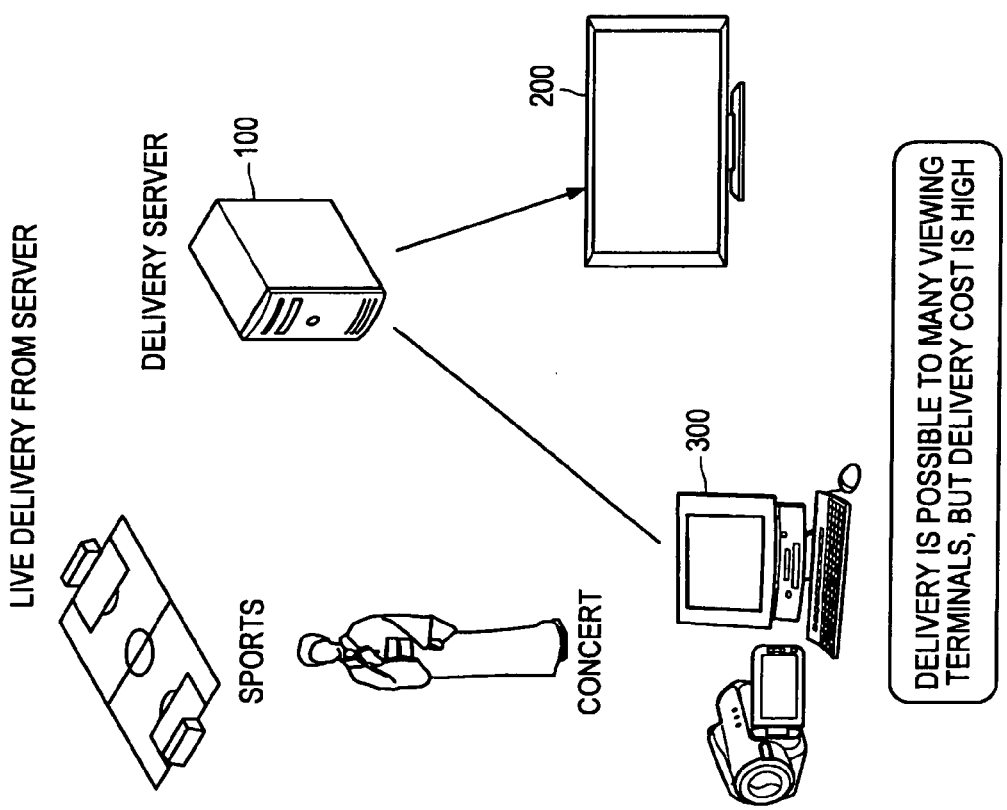

Overview of system of present embodiment
Specific structural example of system according to present embodiment
Processing sequence of system according to present embodiment 1. Overview of System of Present Embodiment FIG. 1A and FIG. 1B are a schematic diagrams respectively showing an overview of a method to deliver live video images. FIG. 1A shows a structure in which live video images taken at a sports event, a concert etc. are collected into a moving image delivery server 100 and the live video images are transmitted from the moving image delivery server 100 to a viewing terminal 200 of each user. The transmission by the moving image delivery server 100 makes it possible to deliver the live video images to many of the viewing terminals 200, but it has a disadvantage in that a delivery cost becomes high. On the other hand, FIG. 1B shows a structure in which live video images are directly transmitted from a delivery terminal 300 to the viewing terminal 200, the delivery terminal 300 having captured the live video images. In this case, a heavy load is not put on the moving image delivery server 100, but there is a disadvantage in that the number of live video images that can be delivered becomes smaller.

2. Concrete Structural Example of System According to Present Embodiment

Figure 2:
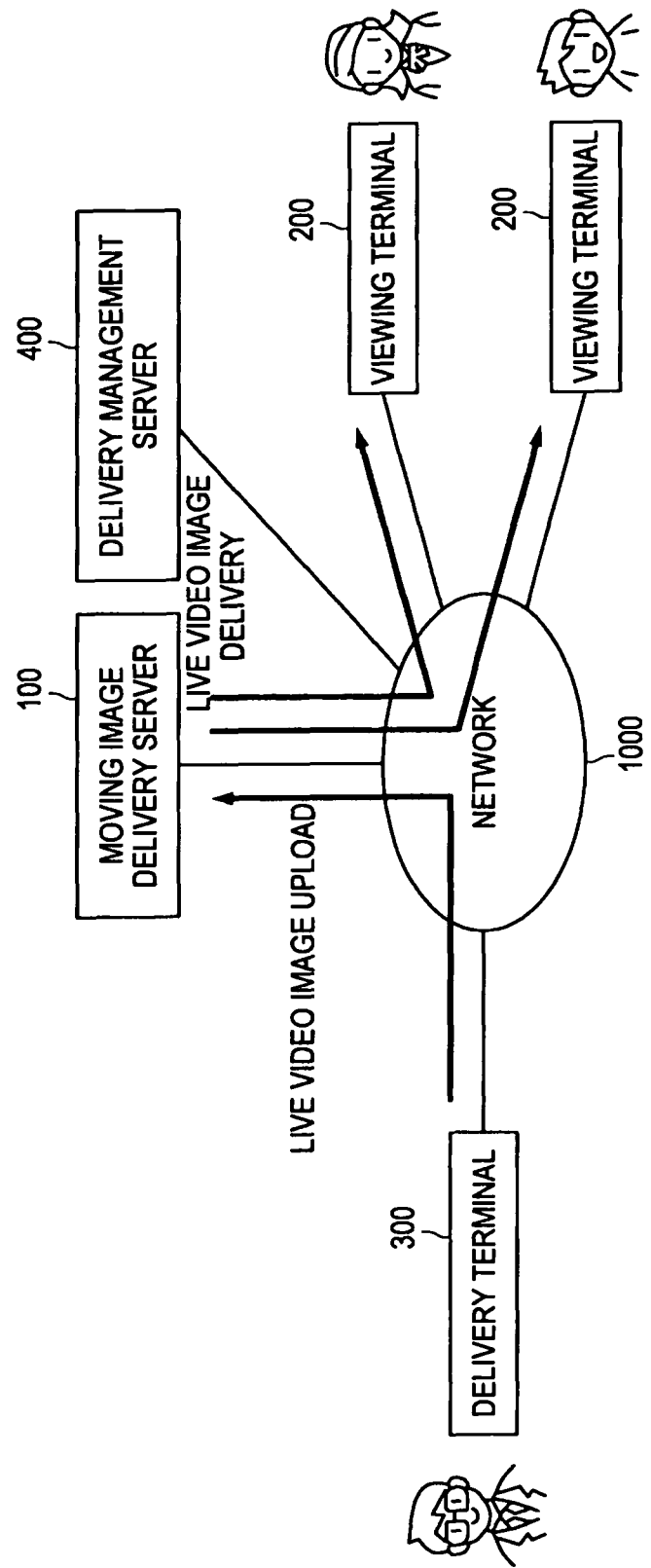
FIG. 2 is a schematic diagram showing a structure of a general live video image delivery network corresponding to FIG. 1A.

A detailed explanation will be made below with reference to FIG. 2. FIG. 2 is a schematic diagram showing a structure of a general live video image delivery network corresponding to FIG. 1A. A delivery provider who performs a delivery uploads the live video images from the delivery terminal 300 to the moving image delivery server 100 and the moving image delivery server 100 delivers the live video images to the viewing terminal 200. A high performance device that has high moving image delivery performance etc. is used as the moving image delivery server 100. Further, by using a network having a large bandwidth as a network 1000 to which the moving image delivery server 100 is connected and by using a technology such as multi-cast technology, it becomes possible to perform delivery of the moving images to more than or equal to several thousands of the viewing terminals 200. On the other hand, since the device such as the high performance moving image delivery server 100 and the network 1000 that has the large bandwidth are used in the structure shown in FIG. 2, when the moving images are delivered to a small number of the viewing terminals 200, the method shown in FIG. 2 becomes relatively expensive compared with a method shown in FIG. 3 that will be explained below.

Figure 3:
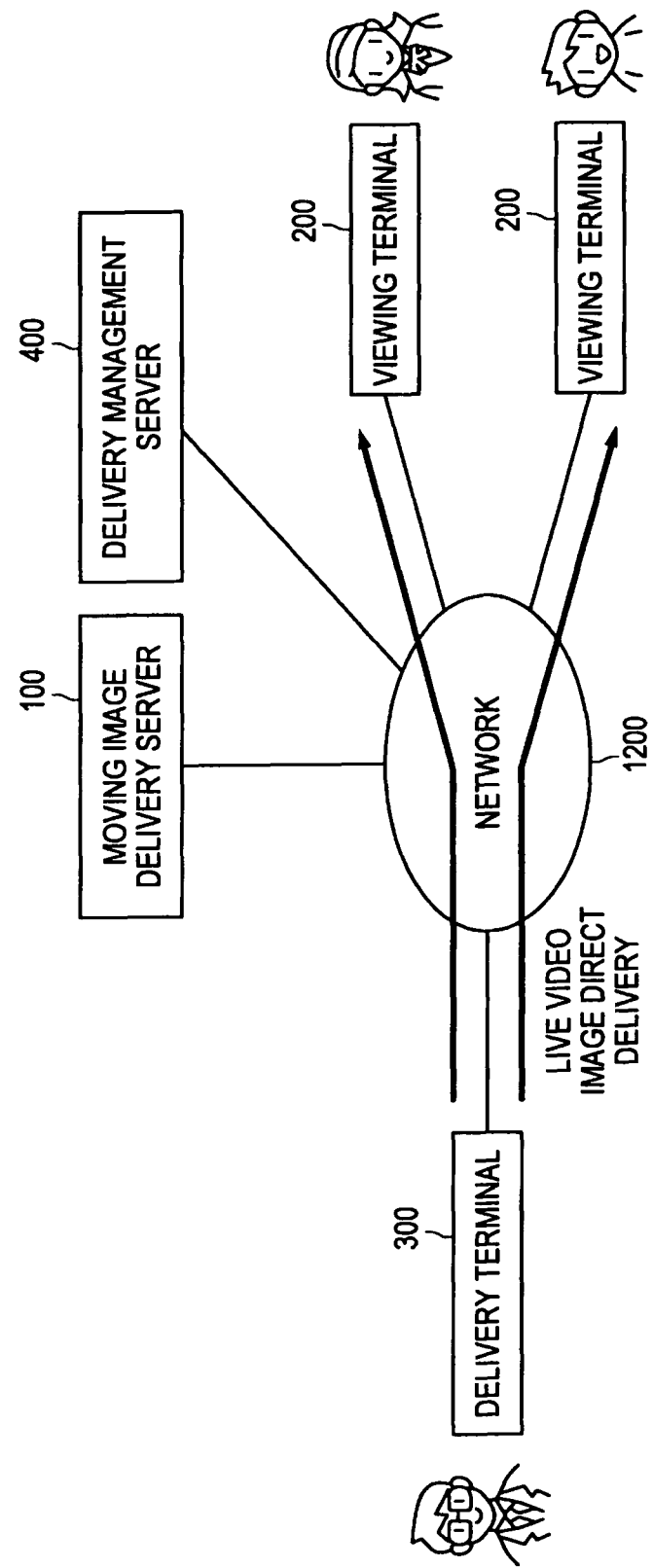
FIG. 3 is a schematic diagram showing a structure of a network that directly delivers the live video images, as illustrated in FIG. 1B.

FIG. 3 is a schematic diagram showing a structure of a network that directly delivers the live video images, as illustrated in FIG. 1B. In the structure shown in FIG. 3, the live video images are directly delivered from the delivery terminal 300 to the viewing terminal 200 via a network 1200 without going through the moving image delivery server 100. Due to an increased network bandwidth of a household-use network and an improved capability of a personal computer (PC) in recent years, even with respect to high definition (HD) live video images, it is possible to deliver the live video images to tens of the viewing terminals 200 by using the structure shown in FIG. 3. With the structure shown in FIG. 3, compared with the delivery method shown in FIG. 2, since it is not necessary to prepare the high performance device nor a dedicated network with a large bandwidth, it is possible to perform delivery at a relatively low cost. On the other hand, with the structure shown in FIG. 3, since a capability of the delivery terminal 300 is lower than the moving image delivery server 100 and a bandwidth of the network 1200 is smaller than that of the network 1000 shown in FIG. 2, some difficulties are incurred when delivering the live video images to a large number of the viewing terminals 200.

Figure 4:
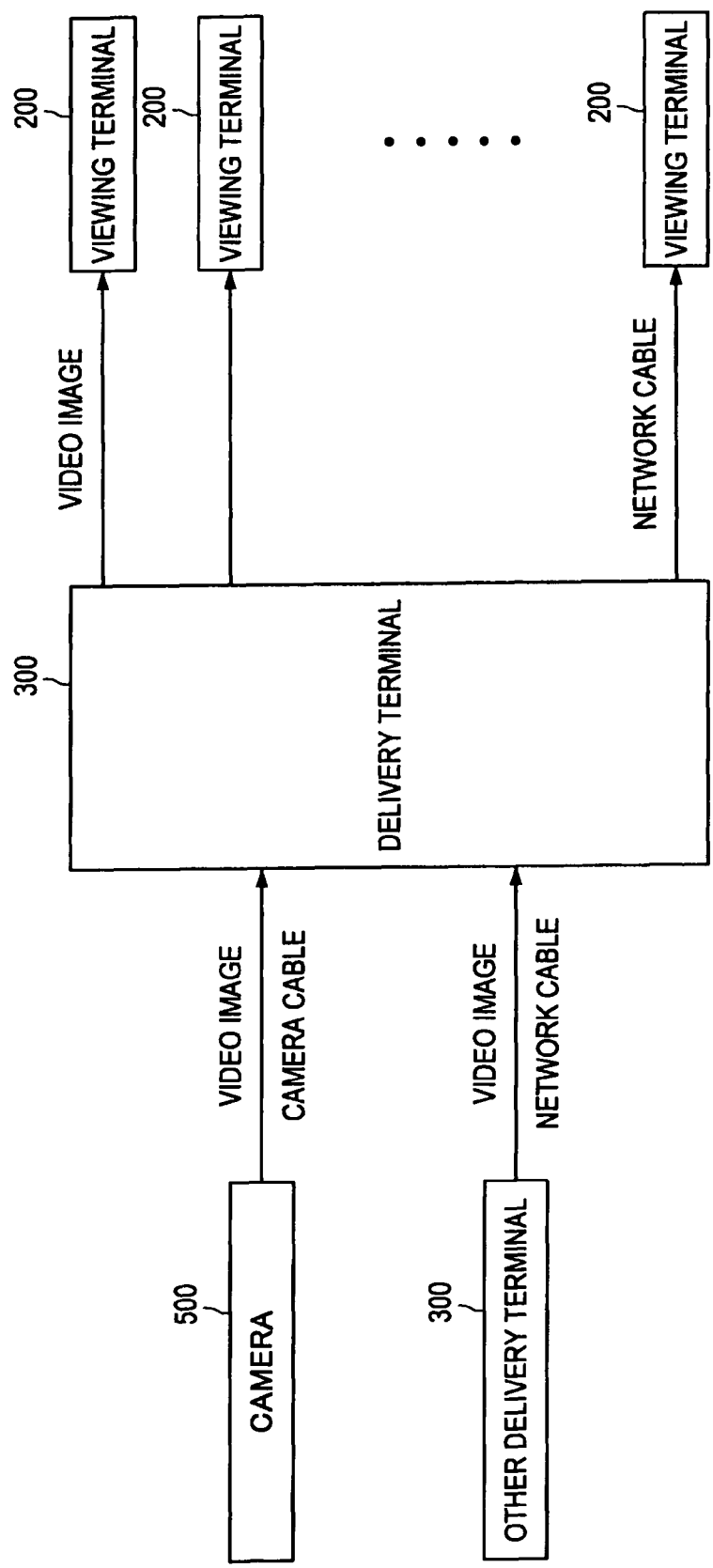
FIG. 4 is a diagram showing a video image delivery input/output using a delivery terminal in the structure shown in FIG. 3.

FIG. 4 is a diagram showing a video image delivery input/output using the delivery terminal 300 in the structure shown in FIG. 3. A video image is input into the delivery terminal 300 from a camera (an imaging device) 500 or another of the delivery terminals 300. The video image may be input either via a wire (a cable) or via a network. The delivery terminal 300 can deliver the video image that is input to a plurality of the viewing terminals 200.

FIG. 5 is a schematic diagram showing a network structure for live delivery using an available delivery terminal 302 (a delivery terminal that is not being used). Since the delivery terminal 300 can also deliver the video image that is input via the network, the delivery terminal 300 utilizes the available delivery terminal 302, which is not currently being used, as a booster for delivering the live video images while using this function. When it is assumed that a total number of the viewing terminals 200 to which each of the delivery terminals 300 and each of the available delivery terminals 302 can deliver the live video images is N, it becomes possible to deliver the live video images to a total number N of the viewing terminals 200 by using the available delivery terminal 302. With this delivery method, it is possible to perform the live delivery to a larger number of the viewing terminals 200 than a number of the viewing terminals 200 to which the live video images can be directly delivered using only the delivery terminal 300 illustrated in FIG. 3. On the other hand, when the number of the viewing terminals 200 becomes large, the delivery using the moving image delivery server 100 shown in FIG. 2 becomes advantageous in terms of cost. Therefore, a delivery method shown in FIG. 5 is suitable for delivery when the number of the viewing terminals 200 is less than the number of the viewers for which the moving image delivery server 100 shown in FIG. 2 is considered appropriate in terms of delivery cost.

As described above, it is possible to select the delivery method for performing efficient live delivery in an optimum manner by using the delivery terminal 300 and the moving image delivery server 100 appropriately depending on the number of the viewing terminals 200.

FIG. 6 is a schematic diagram showing a viewing start sequence of a viewing user. First, the viewing terminal 200 is connected to a delivery management server 400 (step S10) and obtains a program guide. When the user selects a program that he/she wants to view from the program guide, the fact that the program has been selected by the user is notified to the delivery management server 400 (step S12). If the program selected by the viewing terminal 200 is currently being broadcast, the delivery management server 400 notifies the viewing terminal 200 of information regarding the delivery terminal 300 (or the available delivery terminal 302) or the moving image delivery server 100 (step S14), namely information regarding whichever is currently delivering the live video images. On the basis of the notified information, the viewing terminal 200 is connected to the delivery terminal 300, to the available delivery terminal 302 or to the moving image delivery server 100, whichever is delivering the live video images (step S16), and reception of the live video images is started (step S18).

Further, if the program selected by the viewing terminal 200 is not yet being broadcast, when the program is selected, it is stored in the delivery management server 400 that the program is reserved. Then, when the program starts being delivered, the viewing terminal 200 is notified of information regarding the delivery terminal 300, the available delivery terminal 302 or the moving image delivery server 100 (whichever is delivering the live video images that have been reserved), and it becomes possible to receive the live video images. In the delivery management server 400, information noting that the program has been reserved is used for making a delivery determination to perform efficient live delivery.

By using the sequence shown in FIG. 6, it is possible for the user to receive the live video images using a substantially similar mechanism without being influenced by different types of device on a delivery side (the moving image delivery server 100, the delivery terminal 300 and the available delivery terminal 302).

FIG. 7 is a sequence diagram showing delivery start processing by a delivery provider of the live video images. The delivery terminal 300 registers program information to the delivery management server 400 in advance (step S12). The delivery management server 400 adds the registered program information to the program guide, determines an optimum delivery method at a certain timing before starting delivery (step S21) and notifies the delivery terminal 300 (step S22). When the delivery terminal 300 is instructed by the delivery management server 400 to use the available delivery terminal 302 or the moving image delivery server 100, the delivery terminal 300 is connected to the specified terminal (the available delivery terminal 302 or the moving image delivery server 100) (step S24) and moving image delivery is performed (step S26). In this case, the live video images are transmitted from the delivery terminal 300 to the available delivery terminal 302 and then from the available delivery terminal 302 to the viewing terminal 200. Alternatively, the live video images are uploaded from the delivery terminal 300 to the moving image delivery server 100 and then transmitted from the moving image delivery server 100 to the viewing terminal 200. Further, when the delivery terminal 300 is instructed by the delivery management server 400 to directly deliver the live video images, after being connected by the viewing terminal 200 (step S28), the delivery terminal 300 performs delivery of the video images (step S29).

Next, a method for the delivery management server 400 to select the optimum delivery method at step S21 in FIG. 7 will be explained. FIG. 8 is a schematic diagram showing information that is managed on a database within the delivery management server 400. As shown in FIG. 8, a program guide database and a delivery terminal management database are managed on the database within the delivery management server 400. The program guide database manages such information as a program name, a delivery provider, a delivery time, a number of viewers who have reserved a program (a number of viewer reservations) and a number of current viewers (a number of viewers). The delivery terminal management database manages such information as a delivery terminal name, a delivery terminal IP address, a maximum potential number of deliveries, a current status of the delivery server and a current number of deliveries.

Figure 9:
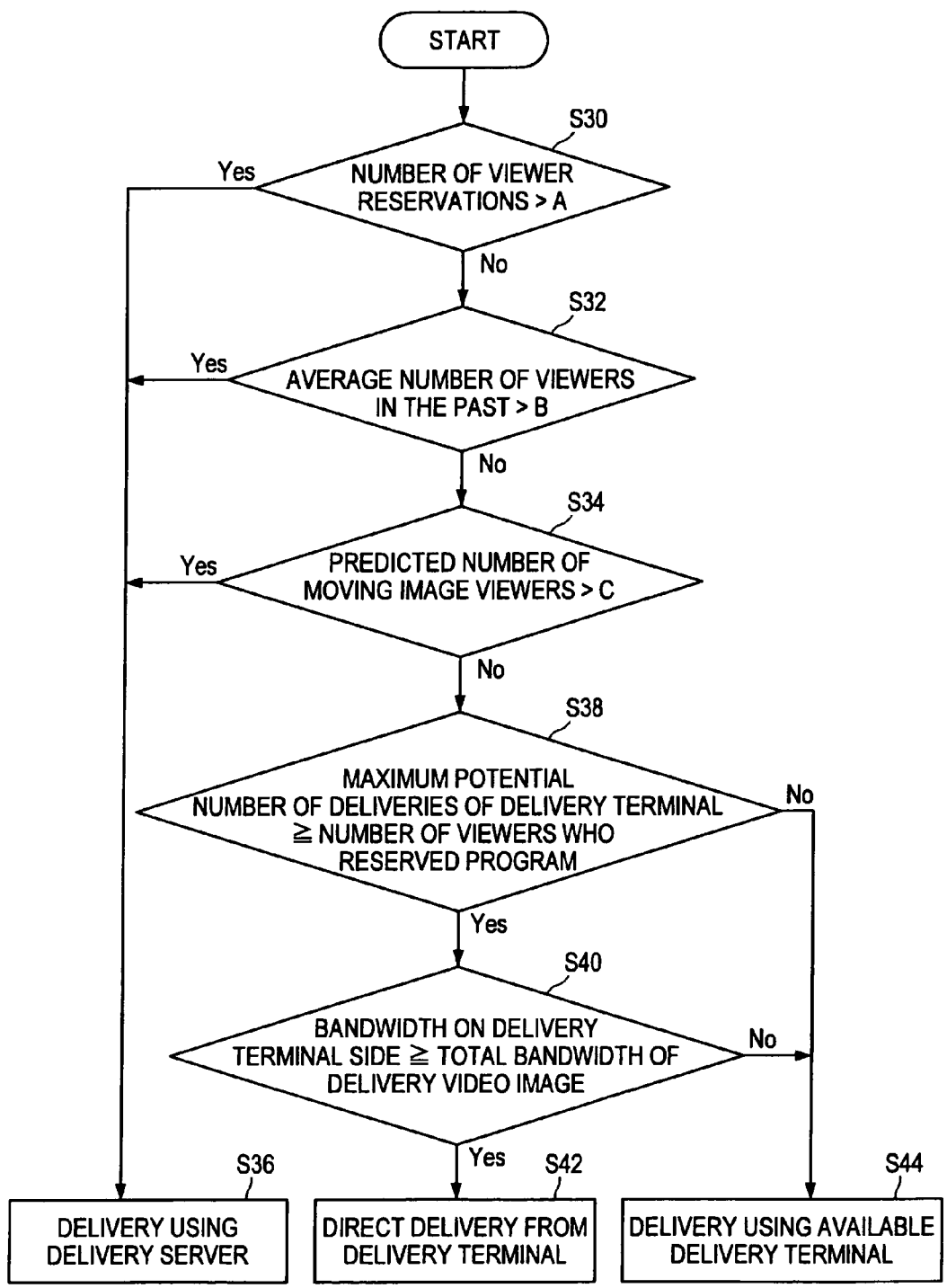
FIG. 9 is a flow chart showing processing by the delivery management server to select an optimum delivery method before starting the video image delivery.

FIG. 9 is a flow chart showing processing by the delivery management server 400 to select the optimum delivery method before starting the video image delivery. In the processing shown in FIG. 9 a determination is made at the certain timing before delivering the video image. Based on the processing shown in FIG. 9, the delivery management server 400 predicts that the number of viewers for a chosen program will be large when a number of viewer reservations, an average number of viewers that have viewed the program delivered by the delivery provider in the past, or a predicted number of viewers of the moving images exceed a certain number. In such a case, the delivery management server 400 determines that it is optimum to use the moving image delivery server 100 for the delivery. In specific terms, at step S30, step S32 and step S34 shown in FIG. 9, when one of the following conditions is satisfied, namely when the number of viewer reservations for the program is larger than A (number of people), when the average number of viewers who have viewed the program in the past is larger than B (number of people) or when the predicted number of moving image viewers is larger than C (number of people), the processing proceeds to step S36. At step S36, delivery is performed using the moving image delivery server 100. Further, parameters that can predict the number of viewers may be added as other conditions, the parameters including a number of people who participate in a community created by the delivery provider, or a number of users who register the delivery provider as their "favorite" etc.

On the other hand, when it is predicted that the number of viewers will be small, the moving image delivery server 100 is not used. In specific terms, when none of the conditions at step S30, step S32 and step S34 shown in FIG. 9 is satisfied, the processing proceeds to step S38. Then, at step S38 and at step S40, when one of the following conditions is satisfied, namely when the number of viewer reservations for the program is less than the maximum potential number of deliveries by the delivery terminal 300 or when a total bandwidth required for the video image delivery is smaller than the network bandwidth of the delivery terminal 300, the processing proceeds to step S44, since it can be determined that a capability of the delivery terminal 300 on its own is not sufficient to perform the delivery, and the delivery that also uses the available delivery terminal 302 is performed.

Further, at step S38 and at step S40, when the maximum potential number of deliveries is larger than or equal to the number of viewer reservations for the program and when the total bandwidth required for the video image delivery is larger than or equal to the network bandwidth of the delivery terminal 300, the processing proceeds to step S42. In this case, since it is possible to perform a direct delivery from the delivery terminal 300, the direct delivery is performed from the delivery terminal 300 at step S42.

Selection of the available delivery terminal 302 is performed from the delivery terminal management database shown in FIG. 8. At this time, in order to make it possible to perform efficient delivery, a similar provider to a provider that is used by the delivery terminal 300 may be selected, or the available delivery terminal 302 that is reliably available until the program finishes may be deliberately selected.

Although the optimum delivery method is selected before a start of broadcast by using the above-described method, the optimum delivery method may change during the broadcast due to a change in the number of viewers. For example, when the number of viewers increases during the broadcast (when the video images are being delivered), due to an insufficient capability of the delivery terminal 300 or an insufficient bandwidth of the network 1000 to which the delivery terminal 300 is connected, it is possible that it becomes unable to deliver the video images to new viewers. Further, when the number of viewers decreases during the broadcast, it is possible that the delivery terminal 300 or the moving image delivery server 100, which has an excessive capability with respect to the current number of viewers, may continue to be used.

Figure 10:
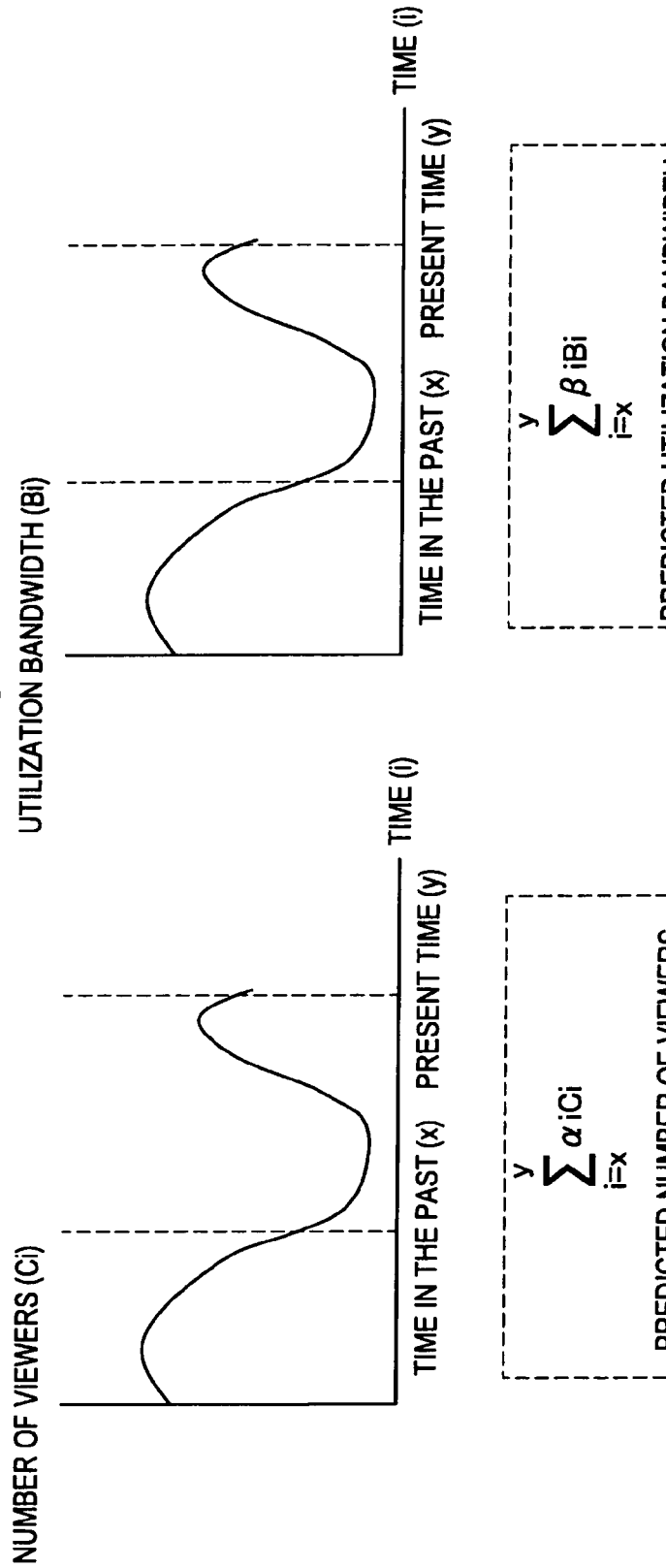
FIG. 10 shows a method to determine the optimum delivery method while the live video images are being delivered.
Figure 11:
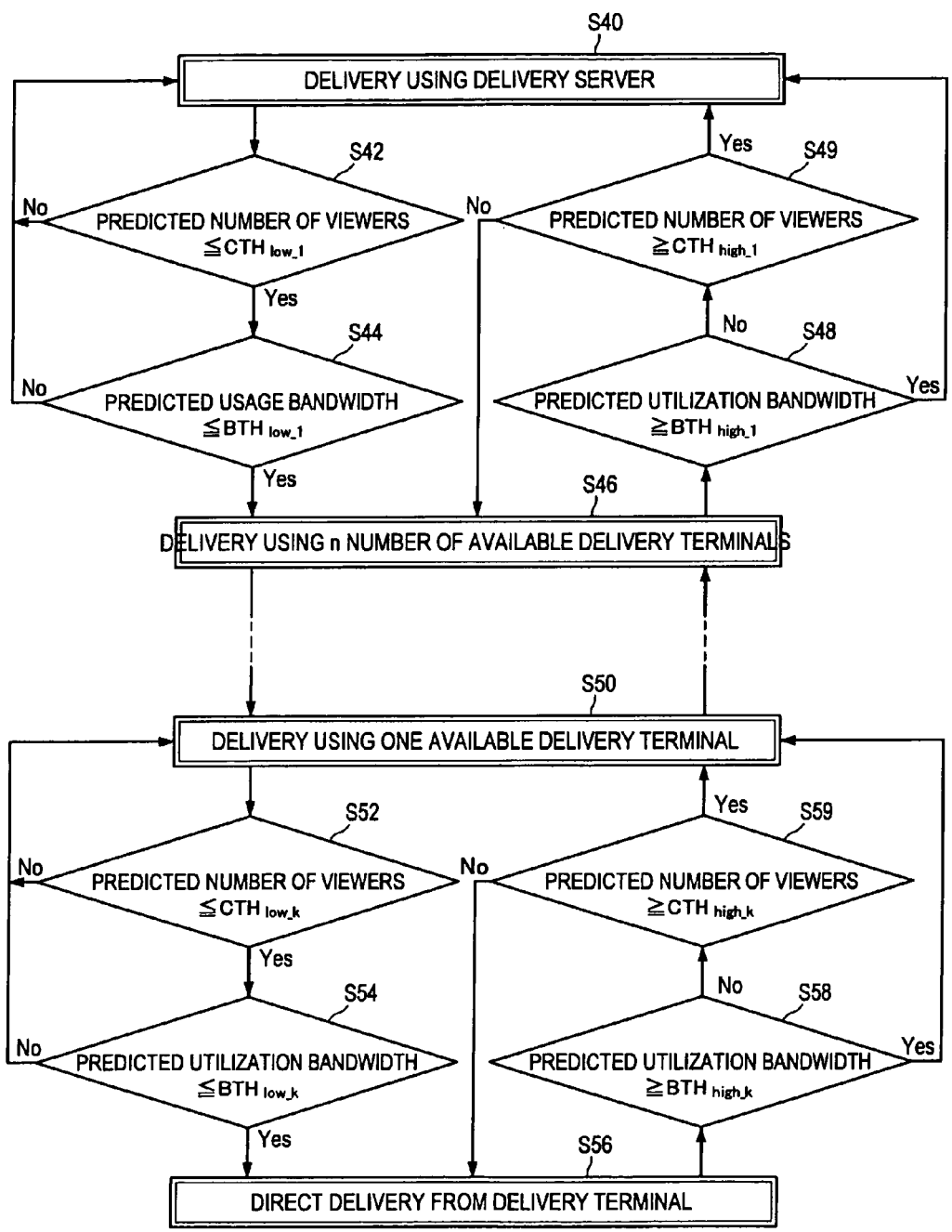
FIG. 11 shows the method to determine the optimum delivery method while the live video images are being delivered.

FIG. 10 and FIG. 11 show a method to determine the optimum delivery method while the live video images are being delivered. Processing shown in FIG. 10 and FIG. 11 is performed at certain intervals while the live video images are being delivered. First, as shown in FIG. 10, a predicted value of the number of viewers is calculated. As shown in FIG. 10, the predicted value of the number of viewers (a predicted number of viewers) is a value that is obtained by multiplying a number of viewers $C_i$ and a coefficient $\alpha_i$ and summing all the multiplied results, the number of viewers $C_i$ being sampled at certain intervals between a time x in the past and a present time y. A sum of the coefficient $\alpha_i$ is 1, and the closer $\alpha_i$ values are to the present time the values become larger so that a trend closer to the present time has a greater impact on the predicted value. Next, a predicted value of a utilization bandwidth is calculated. As shown in FIG. 10, the predicted value of the utilization bandwidth (a predicted utilization bandwidth) is a value obtained by multiplying a number of viewers $B_i$ and a coefficient $\beta_i$ and summing all the multiplied results, the number of viewers $B_i$ being sampled at certain intervals between the time x in the past and the present time y.

Next, as shown in FIG. 11, threshold values CTH low__1, BTH low__1, CTH high__1 and BTH high__1 are calculated in advance, and based on the threshold values, it is determined whether the delivery is performed using the delivery server or the delivery is performed using an n number of the available delivery terminals. Here, the threshold value CTH low__1 is a threshold value for the predicted number of viewers, and when the predicted number of viewers is greater than or equal to the threshold value, it can be determined that the "delivery using the n number of the available delivery terminals" is cheaper than the "delivery using the delivery server" in terms of cost, and that the delivery can be performed in terms of capability. Further, the threshold value BTH low__1 is a threshold value for the predicted utilization bandwidth, and when the predicted utilization bandwidth is greater than or equal to the threshold value, it can be determined that the "delivery using the n number of the available delivery terminals" is more appropriate than the "delivery using the delivery server" in terms of the utilization bandwidth.

As shown in FIG. 11, when the delivery using the moving image delivery server 100 is performed at step S40, if both conditions at step S42 and at step S44 are satisfied, the processing proceeds to step S46, and the delivery using the n number of the available delivery terminals 302 is performed. In other words, when the predicted number of viewers≤CTH low__1 is satisfied at step S42 and the predicted utilization bandwidth≤BTH low__1 is satisfied at step S44, the processing proceeds to step S46, and the delivery using the n number of the available delivery terminals 302 is performed. In this way, when the "delivery using the delivery server" is currently being performed, if the predicted number of viewers is less than or equal to CTH low__1 and the predicted utilization bandwidth is less than or equal to BTH low__1, it is determined that the "delivery using the n number of the available delivery terminals" is optimum.

Further, when the delivery using the n number of the available delivery terminals 302 is being performed at step S46, if both conditions at step S48 and at step S49 are satisfied, the processing proceeds to step S40, and the delivery using the moving image delivery server 100 is performed. In other words, when the predicted utilization bandwidth≥BTH high__1 is satisfied at step S48 and the predicted number of viewers≥CTH high__1 is satisfied at step S49, the processing proceeds to step S40, and the delivery using the moving image delivery server 100 is performed. In this way, when the delivery using the n number of the available delivery terminals is currently being performed, if the predicted utilization bandwidth exceeds BTH high__1 or the predicted number of viewers exceeds CTH high__1, it is determined that the "delivery using the delivery server" is optimum.

In a similar manner, threshold values CTH low_k, BTH low_k, CTH high_k and BTH high_k are threshold values by which it is determined whether delivery is performed using a single one of the available delivery terminals 302 or by direct delivery from the delivery terminal 300. As shown in FIG. 11, the threshold values CTH low_k, BTH low_k, CTH high_k and BTH high_k are calculated in advance, and based on the threshold values, it is determined whether the delivery using the n number of the available delivery terminals 302 or the direct delivery from the delivery terminal 300 is performed. Note that although part of an illustration is omitted in FIG. 11, when it is determined whether the delivery using the n number of the available delivery terminals 302 is performed or not, the threshold values CTH low_k, BTH low_k, CTH high_k and BTH high_k are different with respect to each different n value. Then, with respect to each different n value, the threshold values CTH low_k, BTH low_k, CTH high_k and BTH high_k are set individually. Therefore, as a result of comparison with the respective threshold values, it can be determined how many of the available delivery terminals 302 are to be used to perform the delivery.

As shown in FIG. 11, when the delivery using one of the available delivery terminals 302 is performed at step S50, if both conditions at step S52 and at step S54 are satisfied, the processing proceeds to step S56, and the direct delivery from the delivery terminal 300 is performed. In other words, when the predicted number of viewers≤CTH low_k is satisfied at step S52 and the predicted utilization bandwidth BTH low_k is satisfied at step S54, the processing proceeds to step S56, and the direct delivery from the delivery terminal 300 is performed.

Further, when the direct delivery from the delivery terminal 300 is being performed at step S56, if both conditions at step S58 and at step S59 are satisfied, the processing proceeds to step S50, and the delivery using one of the available delivery terminals 302 is performed. In other words, when the predicted utilization bandwidth≥BTH high_k is satisfied at step S58 and the predicted number of viewers≥CTH high_k is satisfied at step S59, the processing proceeds to step S50, and the delivery using one of the available delivery terminals 302 is performed.

Figure 12:
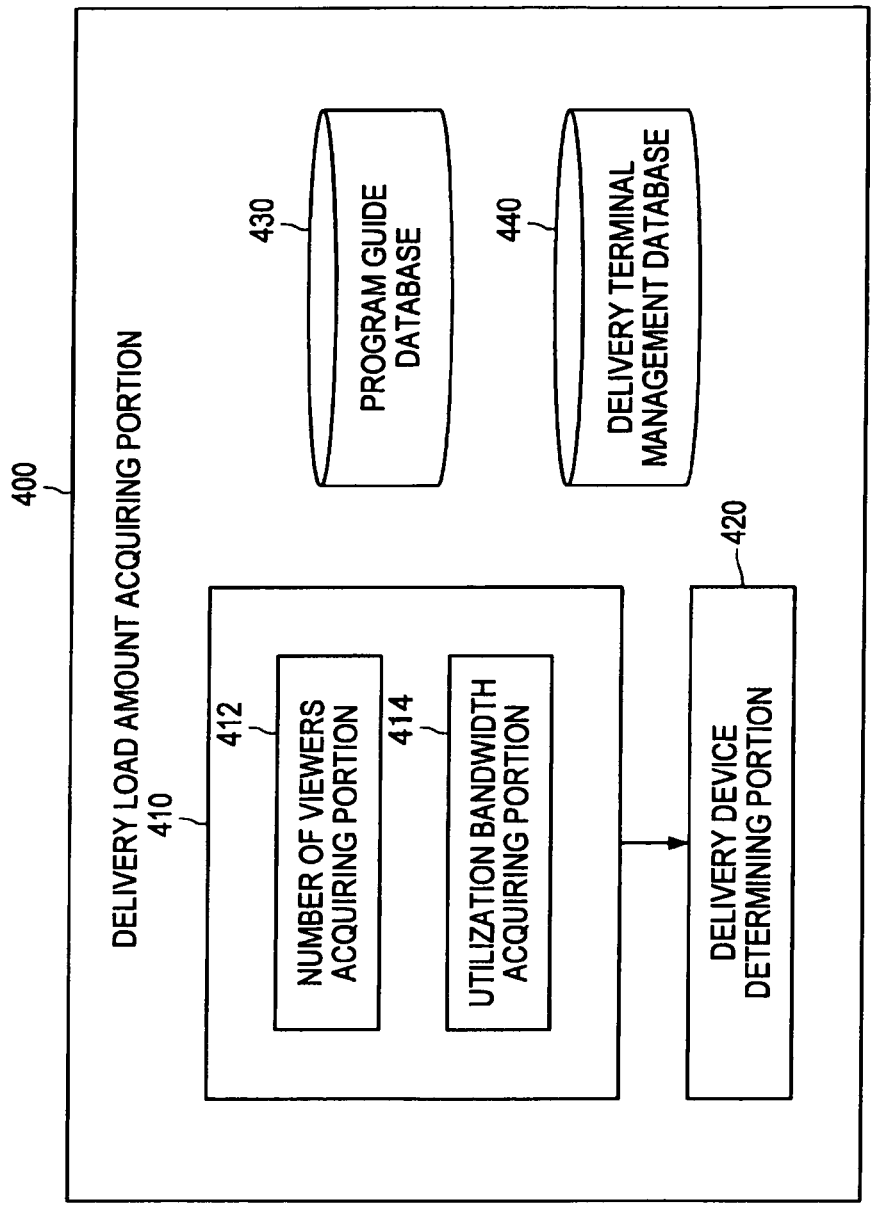
FIG. 12 is a schematic diagram showing a functional block structure of the delivery management server.

As described above, the delivery management server 400 selects the optimum delivery method from methods including the "delivery using the delivery server", the "delivery using one of the available delivery terminals", the "delivery using the n number of the available delivery terminals" and the "direct delivery from the delivery terminal". FIG. 12 is a schematic diagram showing a functional block structure of the delivery management server 400. As shown in FIG. 12, the delivery management server 400 includes a delivery load amount acquiring portion 410, a delivery device determining portion 420, a program guide database 430 and a delivery terminal management database 440. The delivery load amount acquiring portion 410 includes a number of viewers acquiring portion 412 and a utilization bandwidth acquiring portion 414. The number of viewers acquiring portion 412 acquires the number of viewers using the above-described method, and the utilization bandwidth acquiring portion 414 acquires the utilization bandwidth using the above-described method. Based on a delivery load (the number of the viewers, the utilization bandwidth), the delivery device determining portion 420 determines a delivery device that transmits the live video images to the viewing terminal 200. In specific terms, based on the processing shown in FIG. 11, the delivery device determining portion 420 determines which is to be used from among the "delivery using the delivery server", the "delivery using one of the available delivery terminals", the "delivery using the n number of the available delivery terminals" and the "direct delivery from the delivery terminal." Further, when the delivery device determining portion 420 changes the device on the delivery side, the change is notified by the delivery device determining portion 420. In addition, the delivery device determining portion 420 transmits an IP address of the device on the delivery side to the viewing terminal 200, and also, the delivery device determining portion 420 has a function of transmitting an IP address of the viewing terminal 200 to the device on the delivery side. Note that each structural element shown in FIG. 12 can be formed by a circuit (hardware) or a central processing unit (CPU) and a program (software) that enables the circuit or the CPU to function. According to this type of structure, the delivery management server 400 can dynamically change and determine a type of the delivery device (the moving image delivery server 100 or the delivery terminal 300) and a number of the delivery devices (the number of the delivery terminals 300) based on the number of the viewers or the utilization bandwidth.

3. Processing Sequence of System According to Present Embodiment

Figure 13:
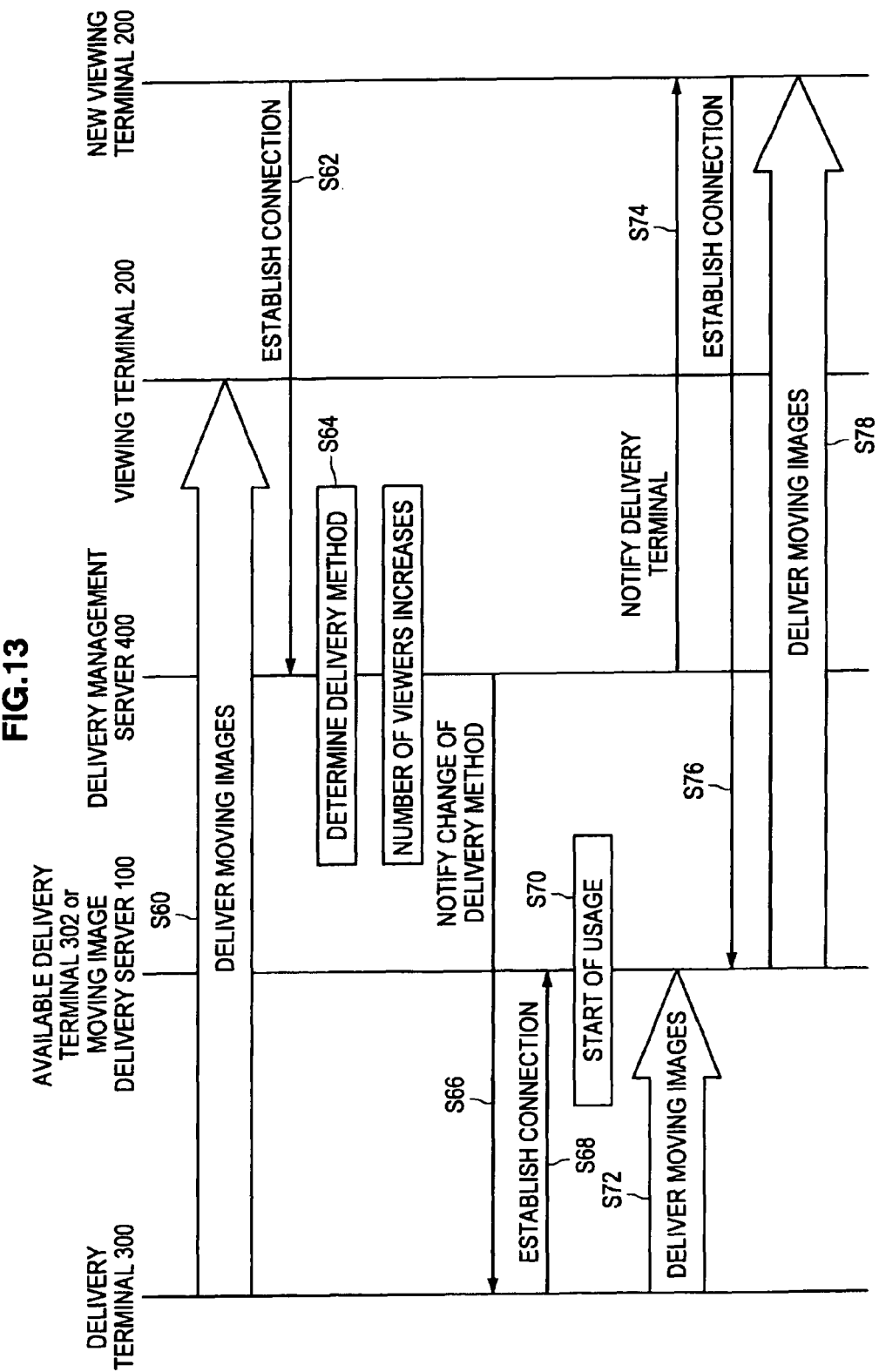
FIG. 13 is a sequence diagram of a case in which use of the available delivery terminal or a delivery server newly starts after a predicted number of viewers or a predicted utilization bandwidth increases.

FIG. 13 is a sequence diagram of a case in which use of the available delivery terminal 302 or of the moving image delivery server 100 newly starts after the predicted number of viewers or the predicted utilization bandwidth increases during the delivery of the live video images. First, at step S60, the live video images are delivered from the delivery terminal 300 to the viewing terminal 200. At step S62, the viewing terminal 200 is newly connected to the delivery management server 400. The delivery management server 400 determines the optimum delivery method at a certain interval (step S64), and when it is determined that the available delivery terminal 302 or the moving image delivery server 100 should be newly used due to an increased number of the viewers, at step S66, a change of the delivery method is notified to the delivery terminal 300. The delivery terminal 300 is connected to a newly specified terminal (step S68) while keeping a current delivery status, and starts delivering the moving images. In an example shown in FIG. 13, the delivery terminal 300 is connected to the available delivery terminal 302 at step S68. As a result, the available delivery terminal 302 starts being used (step S70), and the live moving images are delivered from the delivery terminal 300 to the available delivery terminal 302 (step S72). Further, at step S74, information noting that the available delivery terminal 302 will perform the delivery is notified to a newly connected viewing terminal 200, and at step S76, the newly connected viewing terminal 200 connects itself to the available delivery terminal 302. Then, at step S78, the moving images are delivered from the available delivery terminal 302 to the newly connected viewing terminal 200. In this way, it is possible to newly deliver the live video images from the available delivery terminal 302 to the newly added viewing terminal 200.

Figure 14:
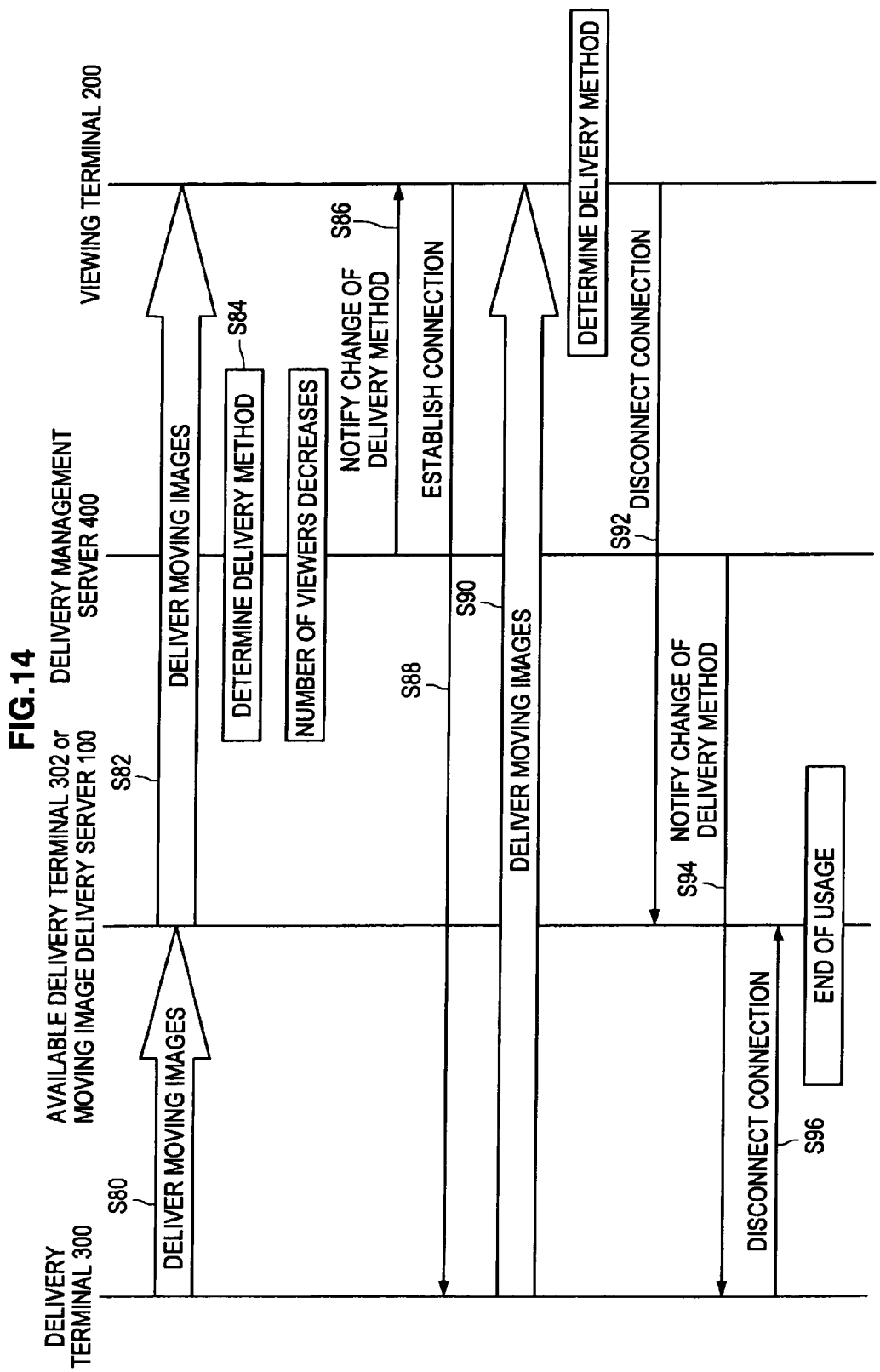
FIG. 14 is a sequence diagram of a case in which use of the currently used available delivery terminal or delivery server is ended after the predicted number of viewers or the predicted utilization bandwidth decreases.

FIG. 14 is a sequence diagram in a case in which use of the currently used available delivery terminal 302 or the moving image delivery server 100 is finished after the predicted number of viewers or the predicted utilization bandwidth decreases. First, it is assumed that the moving images are being delivered from the delivery terminal 300 to the available delivery terminal 302 or to the moving image delivery server 100, and that the live video images are being delivered from the available delivery terminal 302 or from the moving image delivery server 100 to the viewing terminal 200. Here, for the sake of simplified explanation, it is assumed that the moving images are being delivered from the delivery terminal 300 to the available delivery terminal 302 (step S80) and the moving images are being delivered from the available delivery terminal 302 to the viewing terminal 200 (step S82). The delivery management server 400 determines the delivery method (step S84), and when the delivery terminal is to be changed due to factors such as a decreased number of the viewers, information noting that the delivery terminal 300 has been changed is notified to the viewing terminal 200 that is currently viewing the moving images (step S86). This notification includes information that specifies a delivery device after the change. Based on the specification, the viewing terminal 200 connects itself to the delivery terminal 300 (step S88) and receives the moving images from the delivery terminal 300 (step S90). In this way, since the viewing terminal 200 simultaneously receives two streams, namely the stream delivered at step S82 and the stream delivered at step S90, when terminals to which the moving images are delivered are switched, it can be inhibited for the moving images to be interrupted. When the viewing terminal 200 starts viewing the moving images from the delivery terminal 300 at step S90, a connection between the viewing terminal 200 and the available delivery terminal 302 that is finished being used is disconnected (step S92). After that, the delivery management server 400 notifies the delivery terminal 300 of the change of the delivery method (step S94), and the delivery terminal 300 cuts off a connection with the available delivery terminal 302 that is finished being used or with the moving image delivery server 100 (step S96).

As described above, in the system according to the present invention, since live delivery is performed, unlike a Video on Demand (VoD) service, it is not possible to switch delivery methods while caching video image data in advance. Therefore, in order to switch the delivery methods seamlessly, two of the streams are simultaneously received as shown in FIG. 14. Note that, in the above-described example, an example in which the delivery from the available delivery terminal 302 to the viewing terminal 200 is switched to the delivery from the delivery terminal 300 to the viewing terminal 200 is described, but a similar process can be performed when the delivery from the available delivery terminal 302 to the viewing terminal 200 is switched to the delivery from the moving image delivery server 100 to the viewing terminal 200.

By simultaneously receiving the two streams as described with reference to FIG. 14, it is possible to switch the delivery methods without interrupting the moving images that are being viewed by the viewers, but, in this case, the bandwidth on the viewing terminal 200 side needs to be doubled temporarily. Here, for example, in a case of a bandwidth guaranteed type network, such as a Next Generation Network (NGN), since a size of a guaranteed bandwidth used by a client may be limited or fees may be charged per used bandwidth, it is assumed that it becomes necessary to reduce the bandwidth used by the client when the delivery methods are switched.

Figure 15:
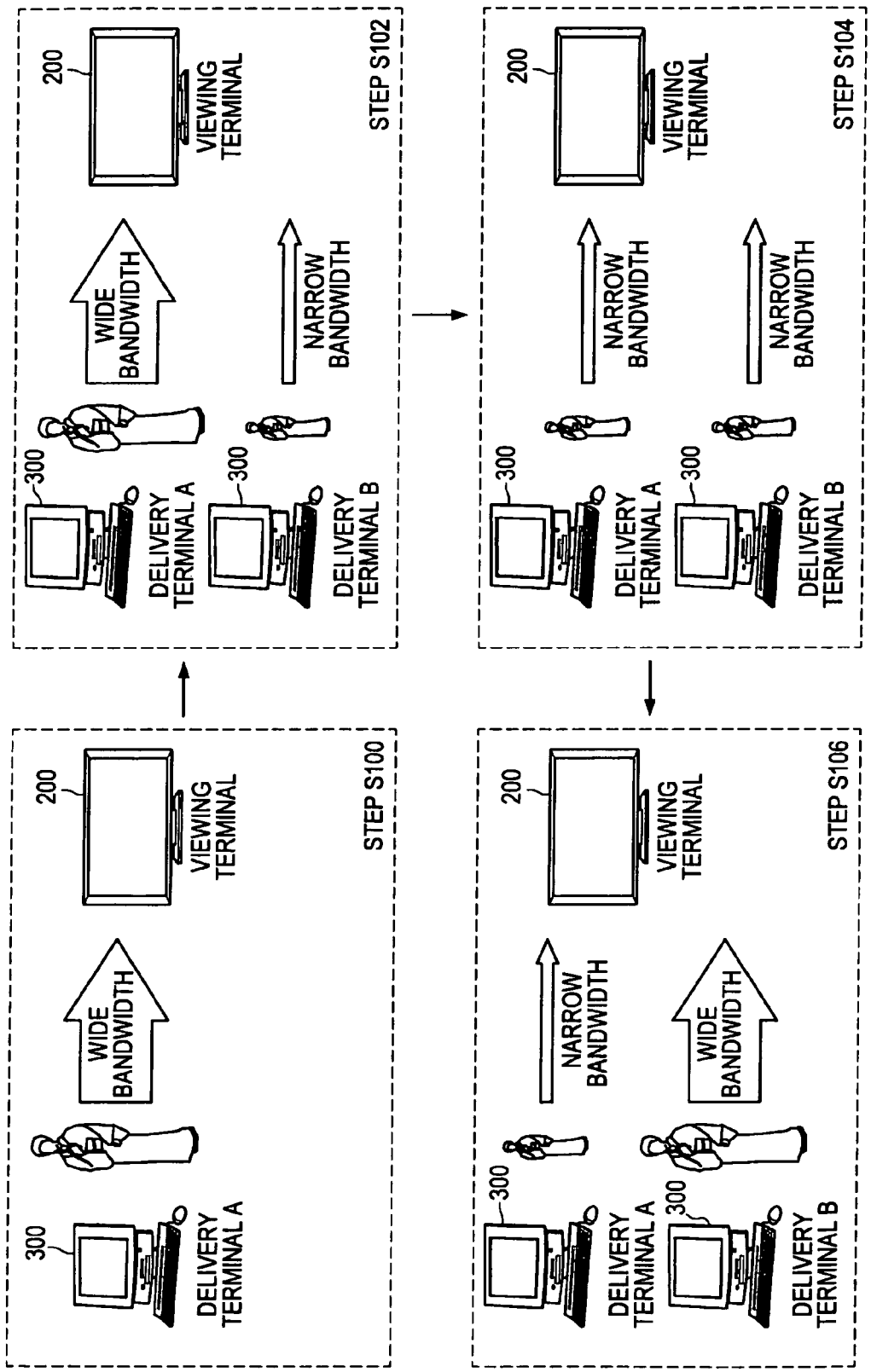
FIG. 15 is a schematic diagram showing a method to temporarily establish a connection to the video image delivery of a narrow bandwidth when terminals are switched.
Figure 16:
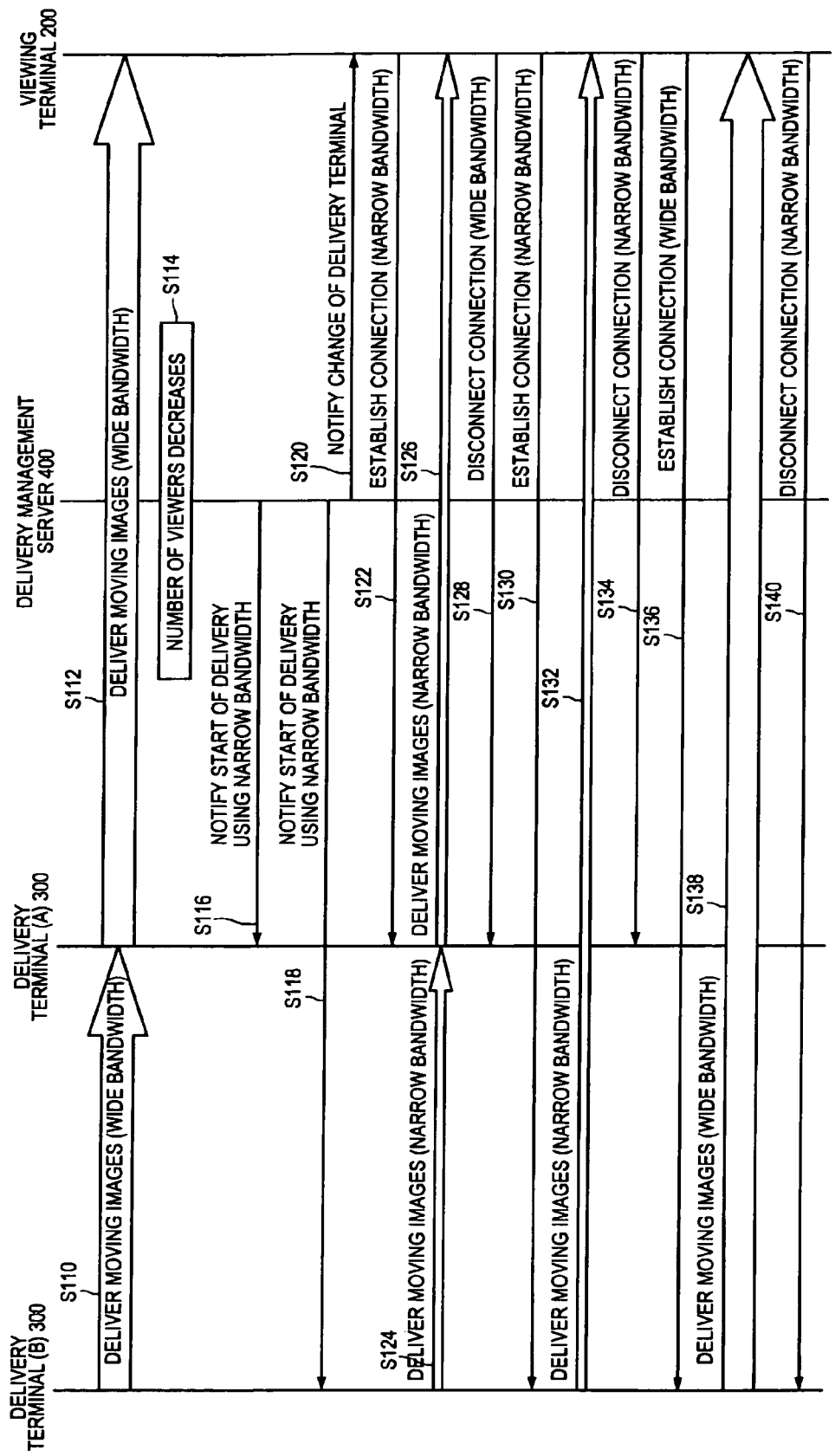
FIG. 16 is a sequence diagram showing the method illustrated in FIG. 15 in detail.

Given the above, FIG. 15 and FIG. 16 show a method to temporarily establish a connection to video image delivery using a narrow bandwidth when terminals are switched. As shown in FIG. 15, at first, at step S100, the moving images are transmitted from a delivery terminal (A) 300 to the viewing terminal 200. Next, at step S102, the moving images are delivered from the delivery terminal (A) 300 to the viewing terminal 200 using a wide bandwidth, and at the same time, the moving images are delivered from a delivery terminal (B) 300 to the viewing terminal 200 using the narrow bandwidth. Next, at step S104, the moving images are delivered from the delivery terminal (A) 300 using the narrow bandwidth, and at the same time, the moving images are delivered from the delivery terminal (B) 300 using the narrow bandwidth. Next, at step S106, the moving images are delivered from the delivery terminal (A) 300 using the narrow bandwidth, and at the same time, the moving images are delivered from the delivery terminal (B) 300 using the wide bandwidth. According to the above-described method, even though the moving images are delivered both from the delivery terminal (A) 300 and the delivery terminal (B) 300, it is possible to inhibit an excessive increase of the utilization bandwidth. In this way, it is not necessary for the bandwidth on the viewing terminal 200 side to be doubled, and as long as there is a sufficient bandwidth that can accommodate up to a total of the wide bandwidth and the narrow bandwidth at a maximum, it is possible to switch the delivery methods seamlessly.

FIG. 16 is a sequence diagram showing the method illustrated in FIG. 15 in detail. At first, at step S110, the moving images are delivered from the delivery terminal (B) 300 to the delivery terminal (A) 300 using the wide bandwidth. Next, at step S112, the moving images are delivered from the delivery terminal (A) 300 to the viewing terminal 200 using the wide bandwidth. The delivery management server 400 monitors the number of the viewers, and when the delivery management server 400 detects a decrease of the number of the viewers (step S114), it sends a notice to the delivery terminal (A) 300 and to the delivery terminal (B) 300, the notice stating that delivery of the moving images using the narrow bandwidth is to be started (step S116 and step S118).

Next, at step S120, a notice is sent from the delivery management server 400 to the viewing terminal 200, the notice stating that the delivery terminal has been changed. As a result, the viewing terminal 200 establishes a connection with the delivery terminal (A) 300 using the narrow bandwidth (step S122). At step S124, the delivery terminal (B) 300 switches the bandwidth from the wide bandwidth to the narrow bandwidth with respect to the delivery of the moving images to the delivery terminal (A) 300, the delivery terminal (B) 300 having received the notice at step S118 stating that the delivery of the moving images using the narrow bandwidth is to be started. Then, at step S126, the delivery of the moving images using the narrow bandwidth is performed from the delivery terminal (A) 300 to the viewing terminal 200.

Next, at step S128, the connection between the viewing terminal 200 and the delivery terminal (A) 300 using the wide bandwidth is disconnected. Then, at step S130, the viewing terminal 200 and the delivery terminal (B) 300 are connected using the narrow bandwidth, and at step S132, the delivery of the moving images is performed from the delivery terminal (B) 300 to the viewing terminal 200 using the narrow bandwidth.

Next, at step S134, the connection between the viewing terminal 200 and the delivery terminal (A) 300 using the narrow bandwidth is disconnected. Next, at step S136, the viewing terminal 200 and the delivery terminal (B) 300 are connected using the wide bandwidth, and at step S138, the moving images are delivered from the delivery terminal (B) 300 to the viewing terminal 200 using the wide bandwidth. Then, at step S140, the connection between the viewing terminal 200 and the delivery terminal (B) 300 using the narrow bandwidth is disconnected.

According to the sequence shown in FIG. 16, since the viewing terminal 200 is never connected to the delivery terminal (A) 300 and the delivery terminal (B) 300 at the same time using the wide bandwidth of two streams, it is possible to minimize an increase of the bandwidth.

As described above, according to the present embodiment, it becomes possible to select the optimum delivery method in advance from perspectives including delivery cost of the live video images, and the network bandwidth used for the delivery etc. Further, even while the video images are being delivered, it is possible to continue selecting the optimum delivery method from perspectives including the delivery cost and the network bandwidth used for the delivery etc. In addition, it is possible to make a switch to the optimum delivery method seamlessly, even while the video images are being delivered, and also, it is possible to make the switch to the optimum delivery method without interrupting the video images that are being delivered while stopping use of the delivery terminal and the delivery server that are being used. Further, when use of the delivery terminal and the delivery server that are being used is stopped, it is possible to stop using the delivery terminal and the delivery server seamlessly while inhibiting an increase of the network bandwidth on the viewing terminal side. In addition, according to the present embodiment, when a load on the delivery server becomes high, it is possible to distribute the load by performing the delivery from a delivery user and also, it becomes possible to predict the number of viewers for each delivery provider. Then, according to the present embodiment, it is possible to distribute the load by performing the delivery from the terminal without increasing a number of lines for the server.

The exemplary embodiments of the present invention are described in detail above with reference to the appended drawings. However, the present invention is not limited to the above-described examples. It should be understood by those skilled in the art that various modifications, combinations, sub-combinations and alterations may occur depending on design requirements and other factors insofar as they are within the scope of the appended claims or the equivalents thereof.

What is claimed is:

1. An image delivery management server comprising:
   a delivery load amount acquiring portion that acquires a delivery load amount of an image that is delivered to a viewer's terminal connected via a network; and
   a delivery device determining portion that determines, based on the delivery load amount, a type or a quantity of a delivery device that performs image delivery to the viewer's terminal,
   wherein the delivery load amount acquiring portion includes a viewer's terminal information acquiring portion that acquires information relating to the viewer's terminal to which the image is delivered,
   wherein the delivery device determining portion determines the type or the quantity of the delivery device in accordance with the information relating to the viewer's terminal,
   wherein the information relating to the viewer's terminal includes at least a current or past number of viewers to which the image is delivered or a number of viewers who have reserved the image that is to be delivered,
   wherein the delivery load amount acquiring portion further includes a utilization bandwidth acquiring portion that acquires a utilization bandwidth of the network that is used by the image delivery,
   wherein the delivery device determining portion determines the type or the quantity of the delivery device based on a number of viewers and the utilization bandwidth,
   wherein the delivery device includes at least one of at least one delivery terminal that directly delivers the image to the viewer's terminal and a delivery server that delivers an image uploaded from the delivery terminal to the viewer's terminal, and
   wherein the delivery device determining portion determines the quantity of the delivery terminal that delivers the image to the viewer's terminal based on a predetermined threshold value relating to one of the number of viewers and the utilization bandwidth, and also determines whether only the delivery server delivers the image to the viewer's terminal.

2. The image delivery management server according to claim 1,
   wherein the delivery device determining portion increases the quantity of the delivery terminal that delivers the image in accordance with an increase of one of the number of viewers and the utilization bandwidth, and determines that only the delivery server delivers the image to the viewer's terminal, when one of the number of viewers and the utilization bandwidth exceeds the predetermined threshold value.

3. The image delivery management server according to claim 1,
   wherein the delivery device determining portion makes a switch from delivery using only the delivery server to delivery using a plurality of the delivery terminals, when one of the number of viewers and the utilization bandwidth becomes less than or equal to the predetermined threshold value, and also decreases the quantity of the delivery terminals by which the image is delivered in accordance with a further decrease of one of the number of viewers and the utilization bandwidth.

4. The image delivery management server according to claim 3,
   wherein the delivery device determining portion causes both a device that is made to stop delivering and a device that is made to continue delivering to temporarily deliver an image stream, when the delivery using only the delivery server is switched to the delivery using the plurality of the delivery terminals or when the quantity of the delivery terminals is decreased.

5. The image delivery management server according to claim 3,
   wherein the delivery device determining portion causes both the device that is made to stop delivering and the device that is made to continue delivering to temporarily deliver the image stream and also makes the bandwidth of each of the image stream narrower than usual, when the delivery using only the delivery server is switched to the delivery using the plurality of the delivery terminals or when the quantity of the delivery terminals is decreased.

* * * * *